United States Patent [19]

Ohya et al.

[11] Patent Number: 5,104,751
[45] Date of Patent: Apr. 14, 1992

[54] MAGNETIC RECORDING MEDIUM LUBRICANT COMPRISING A PHTHALIC ACID DIESTER AND FATTY ACID ESTER

[75] Inventors: Takao Ohya; Satoru Hayakawa, both of Kanagawa, Japan

[73] Assignee: Fuji Photo Film Co., Ltd., Kanagawa, Japan

[21] Appl. No.: 644,861

[22] Filed: Jan. 23, 1991

Related U.S. Application Data

[63] Continuation of Ser. No. 362,120, Jun. 6, 1989, abandoned.

[30] Foreign Application Priority Data

| | | |
|---|---|---|
| Jun. 6, 1988 [JP] | Japan | 63-138958 |
| Jun. 6, 1988 [JP] | Japan | 63-138959 |
| Aug. 23, 1988 [JP] | Japan | 63-209188 |

[51] Int. Cl.$^5$ ............................... G11B 5/72
[52] U.S. Cl. ........................ 428/695; 428/694; 428/900; 252/62.54
[58] Field of Search ............ 560/76; 428/694, 695, 428/900; 252/62.54, 56 R

[56] References Cited

U.S. PATENT DOCUMENTS

| | | | |
|---|---|---|---|
| 2,936,320 | 5/1960 | Benoit | 260/475 |
| 3,019,188 | 1/1962 | Craven et al. | 252/57 |
| 3,875,069 | 4/1975 | Worschech | 252/56 S |
| 3,981,838 | 9/1976 | Wilson | 260/31.6 |
| 4,172,176 | 10/1979 | Tanaka et al. | 428/411 |
| 4,404,247 | 9/1983 | Burguette et al. | 428/694 |
| 4,424,834 | 1/1984 | Sumi et al. | 138/121 |
| 4,741,959 | 5/1988 | Abe et al. | 428/403 |
| 4,828,925 | 5/1989 | Miyake et al. | 428/425.9 |

FOREIGN PATENT DOCUMENTS

| | | |
|---|---|---|
| 024626 | 2/1977 | Japan . |
| 304073 | 12/1988 | Japan . |

Primary Examiner—Merrell C. Cashion, Jr.
Assistant Examiner—Stevan A. Resan
Attorney, Agent, or Firm—Sughrue, Mion, Zinn, Macpeak & Seas

[57] ABSTRACT

A magnetic recording medium having an improved running durability is disclosed, which comprises a non-magnetic support having formed thereon a magnetic layer mainly composed of a ferromagnetic powder and a binder resin, wherein an ester compound selected from the group consisting of a phthalic acid diester represented by formula (I) and a benzenetricarboxylic acid triester represented by formula (II) is contained in the magnetic layer or coated on the magnetic layer:

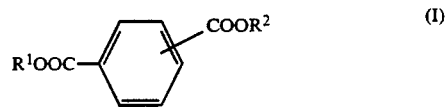

(I)

wherein $R^1$ and $R^2$, which may be the same or different, each represents a straight chain or branched alkyl or alkenyl group and the sum of the carbon atoms of $R^1$ and $R^2$ is at least 22; and

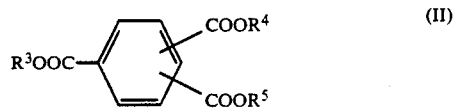
(II)

wherein $R^3$, $R^4$ and $R^5$, which may be the same or different, each represents a straight chain or branched alkyl or alkenyl group and the sum of the carbon atoms of $R^3$, $R^4$ and $R^5$ is at least 22, said ester compound being contained in the magnetic layer in an amount of from 1 to 25% by weight based on the amount of the ferromagnetic power in the magnetic layer or being coated on the magnetic layer in an amount of from 2 to 50 mg/m$^2$.

9 Claims, No Drawings

MAGNETIC RECORDING MEDIUM LUBRICANT COMPRISING A PHTHALIC ACID DIESTER AND FATTY ACID ESTER

This is a continuation of Application No. 07/362,120 filed June 6, 1989, now abandoned.

FIELD OF THE INVENTION

This invention relates to a magnetic recording medium having a magnetic recording layer mainly composed of a ferromagnetic powder and a binder resin formed on a non-magnetic support and, in particular, to a magnetic recording medium having excellent running durability under various temperature and humidity conditions.

BACKGROUND OF THE INVENTION

With the increase of the recording density of magnetic recording, the surface of the magnetic recording layer must be smoother, which results in increasing the coefficient of friction between the magnetic layer while running and each part of a recording and reproducing apparatus, so that smooth running of a magnetic recording medium is hindered and the magnetic layer tends to be damaged. Furthermore, with the popularization of video tape recorders (VTR), personal computers, word processors, etc., as general public devices, the condition for using magnetic recording media, in particular, a temperature and humidity condition becomes more varied.

Moreover, since rotary type magnetic recording media such as floppy disks, etc., for personal computers, word processors, etc., are used for a system wherein an on-off action of a magnetic head is repeatedly applied many times onto the magnetic layer, the running durability of the magnetic recording medium becomes even more important during continuous operation over a prolonged time period at high temperature or under a temperature cycle between high temperature and low temperature.

For solving the aforesaid problems, a method has been proposed of incorporating fatty acid esters into the magnetic layers as described in JP-A-50-22603, JP-A-50-153905, and JP-A-55-139637 (the term "JP-A" as used herein means an "unexamined Japanese patent publication") and JP-B-39-28367, JP-B-41-18065, and JP-B-47-12950 (the term "JP-B" as used herein means an "examined published Japanese patent application"), a method of incorporating silicone compounds in the magnetic layers as described in U.S. Pat. No. 2,654,681, a method of incorporating fatty acids and hydrocarbons in the magnetic layers, etc.

However, in these conventional techniques, there are problems that the aforesaid additives are liable to vaporize from the surface of the magnetic layer under a high temperature condition and, on the other hand, the additives precipitates on the surface of the magnetic layer under a low temperature condition to cause clogging of a magnetic head and the increase of drop out. Also, if the amounts of the additives are increased for improving the effect thereof, they plasticize a binder resin in the magnetic layer to weaken the film strength of the magnetic layer, whereby the durability of the magnetic recording medium is rather reduced.

For solving the aforesaid problems, a method of incorporating a fatty acid ester having a high molecular weight and having a branched hydrocarbon group or an unsaturated hydrocarbon group so that the additive does not readily vaporize from the magnetic layer under high temperature and does not deposit on the surface of the magnetic layer under low temperature, is disclosed in JP-A-58-160425, JP-A-58-218038, JP-A-60-205827, and JP-A-62-125529. However, the esters disclosed in the aforesaid patent publications are in liquid states at room temperature and are compatible with the binder resin of the magnetic layer to plasticize the binder resin, which results in reducing the film strength of the magnetic layer. Thus, a sufficient effect has not yet been obtained by the aforesaid techniques.

Also, as another method for solving the aforesaid problems, a method of using a fatty acid ester having a low melting point in combination with a fatty acid ester having a high melting point is disclosed in JP-A-61-29437 but a sufficient effect is not always obtained in the method.

Furthermore, as still another method, a method of using liquid paraffin and a phthalic acid ester in combination is disclosed in JP B-57-51170, JP-B-60-49972, and JP-B-60-49973. However, although the method has an advantage that oozing out of the liquid paraffin onto the surface of the magnetic layer is properly restrained due to the action of the phthalic acid ester, the phthalic acid ester is liable to vaporize from the magnetic layer at high temperature since the alcohol moiety of the phthalic acid ester is not large and hence there is yet a problem in the running durability of the magnetic recording medium.

SUMMARY OF THE INVENTION

An object of this invention is to provide a magnetic recording medium having an excellent running durability under wide environmental conditions.

As a result of intensive study for solving the aforesaid problems, it has now been discovered that the aforesaid object can be attained by a magnetic recording medium comprising a nonmagnetic support having provided thereon a magnetic layer mainly composed of a ferromagnetic powder and a binder resin, wherein an ester compound selected from the group consisting of phthalic acid diesters represented by formula (I) and benzenetricarboxylic acid triesters represented by formula (II) is contained in the magnetic layer or coated on the magnetic layer:

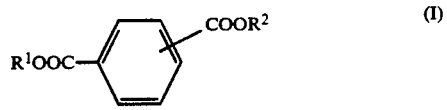
(I)

wherein $R^1$ and $R^2$, which may be the same or different, each represents a straight chain or branched alkyl or alkenyl group, the sum of the carbon atoms of $R^1$ and $R^2$ is at least 22; and

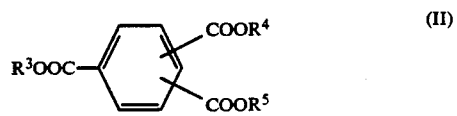
(II)

wherein $R^3$, $R^4$ and $R^5$, which may be the same or different, each represents a straight chain or branched alkyl or alkenyl group, the sum of the carbon atoms of $R^3$, $R^4$ and $R^5$ is at least 22, said ester compound being contained in the magnetic layer in an amount of from 1 to 25% by weight based on the amount of the ferromagnetic powder in the magnetic layer or being coated on the magnetic layer in an amount of from 2 to 50 mg/m².

DETAILED DESCRIPTION OF THE INVENTION

The phthalic acid diester shown by formula (I) and the benzenetricarboxylic acid triester shown by formula (II) have a lubricating effect by themselves and they can impart high running durability to the magnetic recording medium, while they do not cause blooming (or form a white powder) even at a low temperature owing to their good affinity with the binder resin, and are not liable to vaporize from the magnetic layer even at a high temperature owing to the relatively large molecular size, resulting in improvement of the running durabilty of the magnetic recoding medium in a wide temperature range.

The phthalic acid diester of formula (I) and the benzenetricarboxylic acid triester of formula (II) for use in this invention have good affinity with the binder resin as described above but give less adverse effect of plasticizing the binder resin of the magnetic layer to deteriorate the layer quality of the magnetic layer. This is considered to be because the aforesaid ester compounds have a crystallizing property.

The phthalic acid diester for use in this invention shown by the aforesaid formula (I) is explained in detail as set forth below.

The phthalic acid diester includes three kinds of isomers, i.e., an orthophthalic acid diester, an isophthalic acid diester, and a terephthalic acid diester. Of these, a terephthalic acid diester is particularly preferred since the diester has better affinity with the binder resin, minimizing the chance of plasticizing the binder resin to deteriorate the magnetic layer.

Also, the sum cf the carbon atoms of the alcohol moieties $R^1$ and $R^2$ of the aforesaid phthalic acid diester shown by formula (I) is at least 22, and is preferably at least 30, but preferably not more than 60, for improving the running durability of the magnetic recording medium under a high-temperature condition. If the sum of the aforesaid carbon atoms is less than 22, the phthalic acid diester is liable to vaporize from the magnetic layer at a high temperature to reduce the running durability of the magnetic recording medium.

Furthermore, it is preferred that at least one of the alcohol moieties $R^1$ and $R^2$ of the phthalic acid diester is a branched alkyl or alkenyl group preferably having from 4 to 22 carbon atoms since, in this case, the ester is not liable to cause blooming or deposit as a white powder thereof on the surface of the magnetic layer at a low temperature.

Specific examples of the phthalic acid diester for use in this invention are butyl stearyl terephthalate, butyl oleyl terephthalate, butyl behenyl terephthalate, butyl erucyl terephthalate, capryl palmityl terephthalate, captyl stearyl terephthalate, lauryl oleyl terephthalate, lauryl stearyl terephthalate, dimyristyl terephthalate, dipalmityl terephthalate, myristyl elaidyl terephthalate, dilauryl terephthalate, dioleyl terephthalate, dioleyl orthophthalate, dioleyl isophtalate distearyl terephthalate, distearyl orthophthalate, distearyl isophthalate, myristyl oleyl terephthalate, isostearyl n-stearyl terephthalate, erucyl stearyl terephthalate, oleyl palmityl terephthalate, oleyl stearyl terephthalate, dierucyl terephthalate, and dibehenyl terephthalate.

Of these phthalic acid diesters, myristyl oleyl terephthalate, palmityl oleyl terephthalate, oleyl stearyl terephthalate, isostearyl n-stearyl terephthalate, erucyl stearyl terephthalate, dierucyl terephthalate, diisostearyl terephthalate, dioleyl terephthalate and behenyl isostearyl terephthalate are particularly preferred in this invention.

Then, the benzenetricarboxylic acid triester for use in this invention shown by formula (II) described above is explained in detail.

The sum of the carbon atoms of the three alcohol moieties $R^3$, $R^4$, and $R^5$ of the benzenetricarboxylic acid triester of formula (II) is preferably at least 22, more preferably at least 30 and most preferably from 35 to 80 for improving the running durability of the magnetic recording medium at a high temperature condition. If the sum of the carbon atoms is less than 22, the benzenetricarboxylic acid triester is liable to vaporize from the magnetic layer at high temperature to reduce the running durability of the magnetic recording medium.

Moreover, it is preferred that at least one of the alcohol moieties $R^3$, $R^4$, and $R^5$ of the benzenetricarboxylic acid triester is a branched alkyl group or alkenyl group preferably having from 4 to 22 carbon atoms since, in this case, the triester is reluctant to deposit as white powder on the surface of the magnetic layer at low temperature.

The benzenetricarboxylic acid triester for use in this invention shown by formula (II) can be obtained by dehydrocondensing a straight chain or branched monohydric alcohol (which may have an unsaturated bond) and a benzenetricarboxylic acid (e.g., benzene-1,2,4-tricarboxylic acid, benzene-1,2,3-tricarboxylic acid, and benzene-1,3,5-tricarboxylic acid) in an ordinary manner.

Specific examples of the benzenetricarboxylic acid triester for use in this invention are as follows:

No. 1: Tri-2-ethylhexyl benzene-1,2,4-tricarboxylate

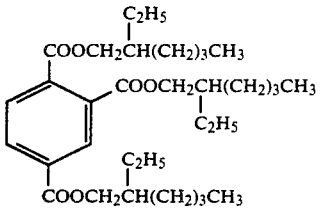

No. 2: Tri-2-hexyldecyl benzene-1,2,4-tricarboxylate

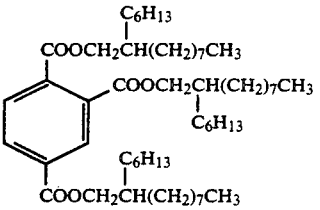

No. 3: Trioctyl benzene-1,2,4-tricarboxylate

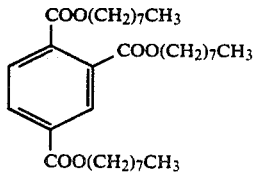

-continued

No. 4: Ester compound obtained by the reaction of benzene-1,2,4-tricarboxylic acid and a mixture of 2-ethylhexyl alcohol/2-hexyldecyl alcohol (1/1 by weight)

No. 5: Trioleyl benzene-1,2,4-tricarboxylate

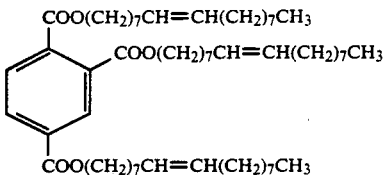

No. 6: Ester compound obtained by the reaction of benzene-1,2,4-tricarboxylic acid and a mixture of oleyl alcohol/octyl alcohol (1/1 by weight)

No. 7: Ester compound of benzene-1,2,4-tricarboxylic acid and a mixture of oleyl alcohol/2-ethylhexyl alcohol (1/1 by weight)

No. 8: Tri-2-ethylhexyl benzene-1,2,3-tricarboxylate

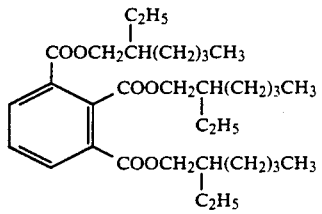

No. 9: Trioctyl benzene-1,2,3-tricarboxylate

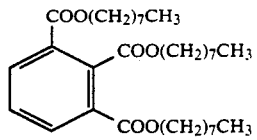

No. 10: Trioleyl benzene-1,2,3-tricarboxylate

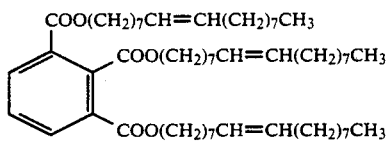

No. 11: Tri-2-ethylhexyl benzene-1,3,5-tricarboxylate

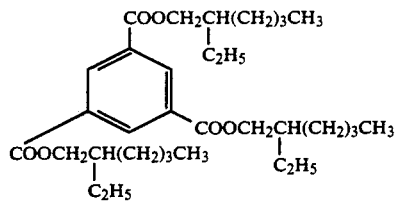

No. 12: Trioctyl benzene-1,3,5-tricarboxylate

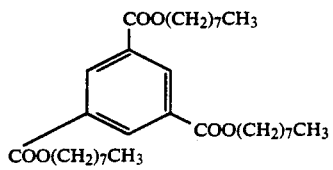

No. 13: Trioleyl benzene-1,3,5-tricarboxylate

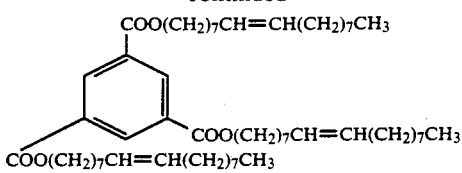

In the aforesaid benzenetricarboxylic acid trieters, the compounds No. 1, No. 2, No. 8, and No. 11 each having the branched alcohol residue structure are particularly preferred.

The aforesaid ester compounds of formulae (I) and (II) of the present invention may be incorporated uniformly in the magnetic layer or may be coated on the surface of the magnetic layer as a top coat layer after the formation of the magnetic layer.

When the ester compound of the present invention is uniformly incorporated in the magnetic layer, the content of the ester compound is from 1 to 25% by weight and preferably from 3 to 20% by weight based on the amount of the ferromagnetic powder in the magnetic layer. Also, when the ester compound is applied as a top coat layer, the amount of the compound is from 2 to 50 mg/m² and preferably from 10 to 50 mg/m².

If the content or the amount of the ester compound is less than the aforesaid range, a sufficient lubricating effect is not attained and, thus, a desired improvement of the running durability of the magnetic recording medium cannot be obtained. Also, if the content of the amount is too large, the amount thereof existing at the surface of the magnetic layer is excessive, so that sticking of the magnetic recording medium onto a magnetic head occurs and the ester compound plasticizes the binder resin to reduce the running durability.

In one embodiment of this invention, the phthalic acid diester shown by formula (I) described above is contained in or coated on the magnetic layer, together with a fatty acid ester having a solidification initiating temperature of at least 30° C. and a molecular weight of at least 450.

Since the aforesaid fatty acid ester has the high solidification initiating temperature and also generally has a high melting point, the fatty acid ester is not liable to vaporize from the surface of the magnetic layer and thus effectively imparts the running durability to the magnetic recording medium even at a relatively high temperature. On the other hand, when the fatty acid ester is used singly, the fatty acid ester is liable to cause blooming or to deposite as a white powder on the surface of the magnetic layer and, in particular, at a relatively low temperature, the fatty acid ester does not sufficiently impart the running durability to the magnetic recording medium and sometimes causes the increase of drop out.

However, the aforesaid phthalic acid diester of formula (I) has good affinity with the aforesaid fatty acid ester and the binder resin. Hence, for example, when the phthalic acid diester is used together with the fatty acid ester in the magnetic layer, the phthalic acid diester functions to properly retain the fatty acid ester in the magnetic layer and suppress the tendency of the fatty acid ester to be deposited on the surface of the magnetic layer, which makes it possible to effectively enjoy the action of the fatty acid ester in a wide temperature range from low temperature to high temperature. Thus a magnetic recording medium having excellent running durability under various environmental conditions can be provided.

It is important that the fatty acid ester be reluctant to vaporize from the magnetic layer and effectively functions even at high temperature. It has been found that the fatty acid ester having a solidification initiating temperature of at least 30° C., preferably 35° C. or higher, and a molecular weight of at least 450, preferably 500 or more, satisfies the aforesaid requirements. A straight chain fatty acid mono-hydric ester is preferred for increasing the durability of the magnetic recording medium.

The term "solidification initiating temperature" herein used means a maximum temperature at which a solidified portion is observed in from 5 to 10 ml of a molten liquid of a fatty acid ester placed in a 20-ml glass bottle when allowed to stand for 30 minutes after the fatty acid ester is molten at 80° C. For example, the term "solidification initiating temperature of at least 30° C." means that the solidified portion is not observed in the liquid when allowed to stand for 30 minutes at a temperature of higher than 30° C.

Specific examples of the aforesaid fatty acid ester are stearyl laurate, palmityl laurate, myristyl laurate, stearyl myristate, palmityl myristate, myristyl myristate, stearyl palmitate, palmityl palmitate, myristyl palmitate, lauryl palmitate, palmityl stearate, myristyl stearate, lauryl stearate, lauryl myristate, lauryl laurate, oleyl palimitate, oleyl stearate, oleyl behenate, stearyl oleate, and palmityl oleate.

Of these fatty acid esters, oleyl palmitate, oleyl stearate, and oleyl behenate are preferred and oleyl stearate is most preferred.

Oleyl stearate has a solidification initiation temperature of 37° C. and when oleyl stearate is incorporated singly, the ester deposits as powder on the magnetic layer at low temperature but by using together with the aforesaid phthalic acid dieser, the deposition of the oleyl stearate at low temperature can be restrained.

In the aforesaid embodiment wherein the fatty acid ester is added together with the phthalic acid diester in the magnetic layer, the amount of the fatty acid ester is preferably from 1.0 to 25% by weight, more preferably from 2 to 16% by weight, based on the amount of the ferromagnetic powder in the magnetic layer. If the amount of the fatty acid ester is over 25% by weight, the amount of the fatty acid ester existing at the surface of the magnetic layer becomes excessive so that running troubles such as sticking to a magnetic head, etc., tend to occur and also the fatty acid ester plasticizes the binder resin to reduce the quality of the magnetic layer. On the other hand, if the amount thereof is less than 1.0% by weight, a sufficient durability is not obtained.

When the fatty acid ester is coated together with the phthalic acid diester on the magnetic layer, on the other hand, the coated amount of the fatty acid ester is preferably from 2 to 80 mg/m$^2$.

In the embodiment of using the phthalic acid diester of formula (I) and the fatty acid ester described above together, it is preferred that the proportion of the phthalic acid diester is from 10 to 50% by weight and more preferably from 13 to 40% by weight of the total weight of the phthalic acid diester and the fatty acid ester. If the proportion of the phthalic acid diester is over 50% by weight, the amount of the fatty acid ester existing at the surface of the magnetic layer is too small to improve the durability of the magnetic medium. On the other hand, if the proportion of the phthalic acid diester is less than 10% by weight, the fatty acid ester is liable to deposit as powder on the surface of the magnetic layer.

In this invention, the aforesaid diester, triester and fatty acid ester can be used together with other lubricant(s). As such lubricants, various materials which are known as lubricants for magnetic recording media can be used.

Examples of such lubricants are saturated or unsaturated fatty acids such as myristic acid, stearic acid, oleic acid, etc.; metal soaps, fatty acid amides, other fatty acid esters than those described above as the specific fatty acid esters in this invention; higher aliphatic alcohols; alkylphosphates; paraffins; silicone oils; animal and vegitable oils; higher aliphatic amines; inorganic fine powders of graphite, silica, molybdenum disulfite, tungesten sulfite, etc.; fine powders of a polymer such as polyethylene, polypropylene, polytetrafluoroethylene, an ethylene-vinyl chloride copolymer, etc.; and various kinds of fluorocarbons.

The amount of the aforesaid lubricant is preferably from 10 to 200% of the aforesaid diester or triester for use in this invention.

There is no particular restriction on the ferromagnetic powder for use in this invention and various kinds of ferromagnetic powders which are conventionally used for magnetic recording media can be used in this invention.

Examples of the ferromagnetic powder are a ferromagnetic metal (or alloy) powder, $\gamma$-Fe$_2$O$_3$, FeO$_x$ ($1.33 \leq x \leq 1.5$), Co-doped iron oxide, CrO$_2$, iron nitride, barrium-ferrite, and strontium-ferrite.

Also, there is no particular restriction on the form of the ferromagnetic powder, and any of acicular, granular, cubic and tabular ferromagnetic powders conventionally used can be used in this invention.

It is preferred for obtaining the high electromagnetic characteristics that the particle size of the ferromagnetic powder is at least 10 m$^2$/g and more preferably 20 m$^2$/g or more in terms of specific area.

When the ferromagnetic powder is ferromagnetic metal powder, it is preferred for obtaining the magnetic recording medium having excellent electromagnetic characteristics that the coercive force of the ferromagnetic powder is at least 800 Oe, the saturated magnetization ($\sigma$s) is at least 100 emu/g, and the particle size thereof is at least 30 m$^2$/g in terms of specific area.

Also, there is no particular restriction on the binder resin for use in this invention, and various kinds of materials which are conventionally used for magnetic recording media can be used.

Examples of the binder resin are a vinyl chloride/vinyl acetate copolymer, a vinyl chloride/vinyl acetate/vinyl alcohol copolymer, copolymers of the aforesaid copolymers and maleic acid and/or acrylic acid, a vinyl chloride/vinylidene chloride copolymer, a vinyl chloride/acrylonitrile copolymer, a ethylene/vinyl acetate copolymer, cellulose derivatives such as a nitrocellulose resin, etc., acrylic resins, polyvinylacetal resins, polyvinyl butyral resins, epoxy resins, phenoxy resins, polyurethane resins, polycarbonate polyurethane resins, etc.

It is preferred for accelarating the dispersion of the ferromagnetic powder in the binder resin and also further increasing the running durability of the magnetic recording medium that a polar group is introduced into the molecule of the binder resin, such as an epoxy group, a carboxy group, an amino group, —SOM, —OSO$_3$M—, PO$_3$M$_2$, and OPO$_3$M$_2$ (wherein M represents a hydrogen atom, an alkali metal or ammonium and when plural Ms exist in one group, they may be the same or different). In this case, the amount of the polar group introduced is preferably from $10^{-6}$ to $10^{-4}$ equivalent per gram of the binder resin.

The aforesaid binder resin is frequently used together with an isocyanate compound for improving the quality of the magnetic layer and increasing the practical characteristics of the magnetic recording medium.

Also, a method of using acrylic acid ester series oligomer and monomer as the binder resin and hardening them by irradiation of radiations can be employed in this invention.

The binder resin is contained in the magnetic layer is in an amount of from 10 to 100 parts by weight, preferably from 20 to 40 parts by weight, per 100 parts by weight of the ferromagnetic powder.

The running durability of the magnetic recording medium can be further increased by incorporating a fine powder of an inorganic material having a Mohs' hardness of at least 5 and preferably at least 8 in the magnetic layer of the magnetic recording medium. Examples of the inorganic material for use at the fine powder are $Al_2O_3$, $TiO$, $TiO_2$, $SiO_2$, $SnO_2$ $Cr_2O_3$, and $\alpha$-$Fe_2O_3$. The amount of the inorganic fine powder is from 0.1 to 20 parts by weight, preferably from 1 to 10 parts by weight, per 100 parts by weight of the ferromagnetic powder.

Furthermore, for improving the practical characteristics of the magnetic recording medium of this invention, other materials such as carbon black, a dispersing agent, and an antistatic agent can be used in the magnetic recording medium.

The thickness of the magnetic layer of the magnetic recording medium of this invention is from 0.3 $\mu$m to 10 $\mu$m, and preferably from 0.5 $\mu$m to 7 $\mu$m.

In this invention, the magnetic layer may be coated on a non-magnetic (or non-magnetizable support) directly or through an intermediate layer containing carbon black, etc., as disclosed in JP-A-62-214513, JP-A-62-214514, and JP-A-62-231417.

As the non-magnetic support for use in this invention, there are polyethylene terephthalate films, polyethylene-2,6-naphthalate films, polypropylene films, polyethylene films, cellulose triacetate films, polycarbonate films, polyimide films, polyimidoamide films, etc.

The thickness of the aforesaid non-magnetic support is usually from 3 $\mu$m to 100 $\mu$m and in particular, it is preferred that the thickness thereof is from 3 $\mu$m to 20 $\mu$m for magnetic recording tape and from 20 $\mu$m to 100 $\mu$m for magnetic recording disk.

In this invention, the phthalic acid diester of formula (I) described above with or without the fatty acid ester described above, or the benzenetricarboxylic acid triester of formula (II) described above is added to a magnetic coating composition mainly composed of the ferromagnetic powder and the binder resin. The coating composition is coated on the non-magnetic support, a magnetic orientation is applied thereto, the coated layer is dried, and, if necessary, a surface smoothening treatment is applied thereto to provide the magnetic recording medium.

The production method for the magnetic recording medium, which can be employed in this invention, is disclosed in JP-A-54-46011 and JP-A-54-21805.

Next, the invention is explained in more detail with reference to the following examples, but the invention is not limited thereto. In the Examples, "parts" are by weight.

EXAMPLE 1

| | |
|---|---|
| Co-doped $FeO_x$ Powder (x = 1.4, mean particle size 0.3 $\mu$m × 0.3 $\mu$m) | 100 parts |
| Vinyl Chloride/Vinyl Acetate/Maleic Anhydride Copolymer ("400X110A", trade name, made by Nippon Zeon K.K.) | 13 parts |
| Polyurethane ("N-2304", trade name, made by Nippon Polyurethane K.K.) | 4 parts |
| $Cr_2O_3$ | 5 parts |
| Carbon Black ("Asahi #80", trade name, made by Asahi Carbon K.K.) | 5 parts |
| Phthalic Acid Diester | kind and amount shown in Table 1 below |
| Oleic Acid | 1 part |
| Methyl Ethyl Ketone | 100 parts |
| Toluene | 100 parts |
| Methyl Isobutyl Ketone | 50 parts |

The aforesaid components were placed in a ball mill and subjected to a kneading and dispersing treatment for about 10 hours to uniformly disperse the ferromagnetic powder. Thereafter, 7 parts of polyisocyanate ("Colonate 3041", trade name, made by Nippon Polyurethane K.K.) was added to the mixture and the resultant mixture was kneaded for 1 hour to provide a magnetic coating composition.

Then, the magnetic coating composition was coated on a polyethylene terephthalate film support having a thickness of 75 $\mu$m, a width of 500 mm, and a surface roughness (Ra value) of 0.028 $\mu$m to form a magnetic layer. Then, the magnetic layer was dried and subjected to a surface smoothening treatment by calender. The thickness of the magnetic layer after the treatment was 2.5 $\mu$m. The magnetic recording medium thus obtained was cut into a floppy disk having a diameter of 3.5 inches to provide each test sample.

TABLE 1

| Sample No. | Phthalic Acid Diester | Amount (parts) |
|---|---|---|
| 1* | Dioleyl Terephthalate | 0.5 |
| 2 | Dioleyl Terephthalate | 3 |
| 3 | Dioleyl Terephthalate | 10 |
| 4 | Dioleyl Terephthalate | 20 |
| 5* | Dioleyl Terephthalate | 30 |
| 6 | Lauryl Oleyl Terephthalate | 10 |
| 7 | Dimyristyl Terephthalate | 10 |
| 8 | Diisostearyl Terephthalate | 10 |
| 9 | Diisopalmityl Terephthalate | 10 |
| 10 | Di-n-palmityl Terephthalate | 10 |
| 11 | Dioleyl Orthophthalate | 10 |
| 12 | Dioleyl Isophthalate | 10 |
| 13* | Butyl Stearate | 10 |
| 14* | Oleyl Oleate | 10 |
| 15* | Dioctyl Terephthalate | 10 |
| 16* | Dibutyl Terephthalate | 10 |
| 17* | Butyl Lauryl Terephthalate | 10 |
| 18* | Octyl Lauryl Terephthalate | 10 |

*Comparative samples

On each of the samples thus obtained, the running durability under a high-temperature and high-humidity condition (70° C., 80% RH) and the running durability in the following temperature and humidity cycle (hereafter "thermocycle") were evaluated.

Temperature Humidity Cycle

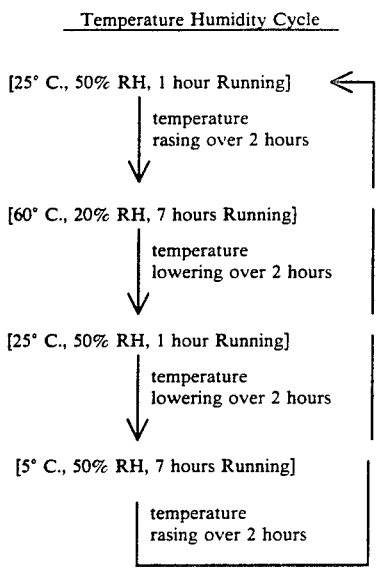

For the evaluation of the running durabilities, a 3.5-inch floppy disk drive ("OA-D32W", made by Sony Corporation) was used, each sample was continuously run at 300 r.p.m., and the path number until the output thereof reduced to 80% of the initial value was measured as the running durability.

The results obtained are shown in Table 2 below.

TABLE 2

| Sample | Running Durability | |
|---|---|---|
| No. | 70° C., 80% RH | Thermocycle |
| 1* | 5,000,000 paths | <1,000,000 paths |
| 2 | 30,000,000 paths | 30,000,000 paths |
| 3 | 40,000,000 paths | >40,000,000 paths |
| 4 | >40,000,000 paths | >40,000,000 paths |
| 5* | 15,000,000 paths | 10,000,000 paths |
| 6 | >40,000,000 paths | >40,000,000 paths |
| 7 | >40,000,000 paths | >40,000,000 paths |
| 8 | >40,000,000 paths | >40,000,000 paths |
| 9 | 40,000,000 paths | 40,000,000 paths |
| 10 | 30,000,000 paths | 25,000,000 paths |
| 11 | 30,000,000 paths | 25,000,000 paths |
| 12 | 30,000,000 paths | 26,000,000 paths |
| 13* | <1,000,000 paths | <1,000,000 paths |
| 14* | 20,000,000 paths | 15,000,000 paths |
| 15* | 5,000,000 paths | 3,000,000 paths |
| 16* | <1,000,000 paths | <1,000,000 paths |
| 17* | 6,000,000 paths | 5,000,000 paths |
| 18* | 9,000,000 paths | 8,000,000 paths |

*Comparative samples

Sample Nos. 1 to 5 are examples of using dioleyl terephthalate as the aforesaid phthalic acid diester of formula (I). In these samples, the case (Sample No. 1) wherein the amount of dioctyl terephthalate was less than 1% by weight of the ferromagnetic powder and the case (Sample No. 5) wherein the amount was over 25% by weight of the ferromagnetic powder showed insufficient running durability, while the cases (Sample Nos. 2 to 4) wherein the amount of dioctyl terephthalate was in the range defined by this invention showed sufficiently high running durability.

Also, Sample Nos. 6 to 12 are examples of this invention using phthalic acid diesters other than dioleyl terephthalate, and each sample showed good running durability. In these samples, however, the samples using the orthophthalic acid diester and the isophthalic acid diester showed a little lower running durability than the samples using the terephthalic acid diester.

Sample Nos. 13 and 14 are the cases of using fatty acid ester in place of the phthalic acid diester of this invention. These samples showed considerably low running durability. Also, in the case of using the phthalic acid diester in which the total carbon atoms of the alcohol moieties was less than 22 as Sample Nos. 15 to 18, the running durability was insufficient in each case.

EXAMPLE 2

This example shows the cases of using the phthalic acid diester of formula (I) together with the fatty acid ester specified in this invention.

| | |
|---|---|
| Co-doped $FeO_x$ Powder (x = 1.4, mean particle size 0.3 μm × 0.3 μm) | 100 parts |
| Vinyl Chloride/Vinyl Acetate/Maleic Anhydride Copolymer ("400X110A") | 13 parts |
| Polyurethane ("N-2304") | 4 parts |
| $Cr_2O_3$ | 5 parts |
| Carbon Black ("Asahi #80") | 5 parts |
| Fatty Acid Ester | kind and amount shown in Table 3 |
| Phthalic Acid Diester | kind and amount shown in Table 3 |
| Methyl Ethyl Ketone | 72 parts |
| Toluene | 72 parts |
| Methyl Isobutyl Ketone | 36 parts |

The above components were placed in a ball mill and subjected to a kneading and dispersing treatment for about 10 hours to uniformly disperse the ferromagnetic powder. Thereafter, 7 parts of polyisocyanate ("Colonite 3041") was added to the mixture, and the resultant mixture was further kneaded for one hour to provide a magnetic coating composition. Then, the magnetic coating composition was coated on a polyethylene terephthalate film support having a thickness of 75 μm, a width of 500 mm, and a surface roughness (Ra value) of 0.028 ∞m to form a magnetic layer, which was dried and subjected to a surface smoothening treatment by calender. The thickness of the magnetic layer after the treatment was 2.5 μm.

The magnetic recording medium thus obtained was cut into a floppy disk of 3.5 inches in diameter as a test sample.

TABLE 3

| Sample No. | Fatty Acid Ester | Amount (parts) | Phthalic Acid Diester | Amount (parts) |
|---|---|---|---|---|
| 1* | Oleyl Stearate | 0.5 | Dioleyl Terephthalate | 0.15 |
| 2 | Oleyl Stearate | 3.0 | Dioleyl Terephthalate | 0.9 |
| 3 | Oleyl Stearate | 10 | Dioleyl Terephthalate | 3.0 |
| 4 | Oleyl Stearate | 20 | Dioleyl Terephthalate | 6.0 |
| 5 | Oleyl Stearate | 30 | Dioleyl Terephthalate | 9.0 |
| 6* | Oleyl Stearate | 10 | Dioleyl Terephthalate | 0.5 |
| 7 | Oleyl Stearate | 10 | Dioleyl Terephthalate | 1.0 |
| 8 | Oleyl Stearate | 10 | Dioleyl Terephthalate | 5.0 |
| 9 | Oleyl Stearate | 10 | Dioleyl Terephthalate | 10 |

TABLE 3-continued

| Sample No. | Fatty Acid Ester | Amount (parts) | Phthalic Acid Diester | Amount (parts) |
|---|---|---|---|---|
| 10 | Oleyl Stearate | 10 | Dioleyl Terephthalate | 20 |
| 11 | Oleyl Stearate | 10 | Lauryl Myristyl Terephthalate | 3 |
| 12 | Oleyl Stearate | 30 | Dimyristyl Terephthalate | 3 |
| 13 | Oleyl Stearate | 10 | Oleyl Stearyl Terephthalate | 3 |
| 14 | Oleyl Stearate | 10 | Oleyl Behenyl Terephthalate | 3 |
| 15 | Oleyl Stearate | 10 | Di-isostearyl Terephthalate | 3 |
| 16 | Stearyl Laurate | 10 | Dioleyl Terephthalate | 3 |
| 17 | Myristyl Palmitate | 10 | Dioleyl Terephthalate | 3 |
| 18 | Stearyl Palmitate | 10 | Dioleyl Terephthalate | 3 |
| 19 | Isostearyl Stearate | 10 | Dioleyl Terephthalate | 3 |
| 20 | Stearyl Stearate | 10 | Dioleyl Terephthalate | 1 |
| 21 | Stearyl Stearate | 10 | Dioleyl Terephthalate | 3 |
| 22 | Stearyl Stearate | 10 | Dioleyl Terephthalate | 5 |
| 23 | Oleyl Stearate | 10 | None | |
| 24* | Oleyl Stearate / n-Butyl Oleate | 10 / 3 | None | |
| 25* | Oleyl Stearate / Octyl Oleate | 10 / 3 | None | |
| 26* | Oleyl Stearate / Oleyl Oleate | 10 / 3 | None | |
| 27* | Oleyl Stearate | 10 | Dioctyl Terephthalate | 3 |
| 28* | Oleyl Stearate | 10 | Didecyl Terephthalate | 3 |

*Comparative sample

On each sample thus obtained, the running durability under a high-temperature and high-humidity condition (70° C., 80% RH) and the running durability in the thermocycle were evaluated in the same manner as in Example 1. Furthermore, the state of blooming (occurence of white powder) was also evaluated by the manner as shown below.

Blooming was evaluated by visually observing the deposition state of white powder on the surface of the magnetic layer of each sample after allowing to stand the sample for one week at 60° C. and 80% RH and then further allowing to stand the sample for 2 days at 5° C., 50% RH.

The evluation results are shown in Table 4.

TABLE 4

| Sample No. | Running Durability | | Blooming** |
|---|---|---|---|
| | 70° C., 80% RH | Thermocycle | |
| 1* | 35,000,000 paths | 30,000,000 paths | o |
| 2 | 40,000,000 paths | 40,000,000 paths | o |
| 3 | >50,000,000 paths | >50,000,000 paths | o |
| 4 | >50,000,000 paths | >50,000,000 paths | o |
| 5 | 30,000,000 paths | 25,000,000 paths | o |
| 6* | >50,000,000 paths | >50,000,000 paths | x |
| 7 | >50,000,000 paths | >50,000,000 paths | o |
| 8 | >50,000,000 paths | >50,000,000 paths | o |
| 9 | 40,000,000 paths | 43,000,000 paths | o |
| 10 | 30,000,000 paths | 25,000,000 paths | o |
| 11 | >50,000,000 paths | >50,000,000 paths | o |
| 12 | >50,000,000 paths | >50,000,000 paths | o |
| 13 | >50,000,000 paths | >50,000,000 paths | o |
| 14 | >50,000,000 paths | >50,000,000 paths | o |
| 15 | >50,000,000 paths | >50,000,000 paths | o |
| 16 | 45,000,000 paths | 43,000,000 paths | o |
| 17 | 43,000,000 paths | 44,000,000 paths | o |
| 18 | 48,000,000 paths | 45,000,000 paths | o |
| 19 | 45,000,000 paths | 45,000,000 paths | o |
| 20 | 45,000,000 paths | 43,000,000 paths | Δ |
| 21 | 46,000,000 paths | 47,000,000 paths | o |
| 22 | 46,000,000 paths | 48,000,000 paths | o |
| 23* | 48,000,000 paths | 48,000,000 paths | x |
| 24* | 48,000,000 paths | 49,000,000 paths | x |
| 25* | 48,000,000 paths | 48,000,000 paths | x |
| 26* | >50,000,000 paths | >50,000,000 paths | x |
| 27* | 45,000,000 paths | 43,000,000 paths | x |
| 28* | 45,000,000 paths | 43,000,000 paths | x |

*Comparative sample
**Evaluation of blooming
o: No white powder observed.
Δ: White powder partially observed.
x: White powder wholly observed.

Sample Nos. 1 to 10 are the examples using oleyl stearate as a fatty acid ester and dioleyl terephthalate as the phthalic acid diester. In these samples, Sample No. 1 wherein the amount of oleyl stearate was 0.5 part per 100 parts of the ferromagnetic powder, and Sample No. 5 wherein the amount of oleyl stearate was 30 parts per 100 parts of the ferromagnetic powder showed less blooming but showed insufficient running durability lower than the running durability of Sample Nos. 2 to 4 wherein the content of oleyl stearate was in the range of from 1.0 to 25 parts per 100 parts of the ferromagnetic powder.

Also, Sample No. 6 wherein the amount of dioleyl terephthalate which is the phthalic acid diester of formula (I) was less than 10% of the total amount of dioleyl terephthalate and the fatty acid ester showed very good running durability of better than 5,000,000 paths but shows inferior blooming and in the sample, a white powder was observed on almost the whole surface of the magnetic layer. This is considered to be based on that since the amount of the phthalic acid diester is too small, oleyl stearate which is the fatty acid ester is not properly retained in the magnetic layer and becomes liable to deposit on the surface of the magnetic layer. On the other hand, Sample No. 10 wherein the amount of the phthalic acid diester was over 50% of the total amount of the fatty acid ester and the phthalic acid diester showed relatively low running durability due to the deficient proportion of the fatty acid ester on the surface of the magnetic layer because many of the fatty acid ester were taken in the inside of the magnetic layer by the phthalic acid diester.

Sample Nos. 11 to 15 are the cases of using various kinds of phthalic acid diesters each having different molecular structure. In each sample, the number of the carbon atoms of $R^1$ or $R^2$ in formula (I) described above was in the range of from 4 to 22 and the total carbon atoms of $R^1$ and $R^2$ were at least 22, and each sample showed good running durability and little blooming. This is considered to be based on that the phthalic acid diester has a proper affinity with the binder resin and also has a proper property of retaining oleyl searate which is a fatty acid ester in the magnetic layer.

On the other hand, Sample Nos. 27 and 28 using a phthalic acid diester wherein the total carbon atoms of $R^1$ and $R^2$ in formula (I) were less than 22 showed a considerably good running durability but were inferior in blooming. It is believed that since such a phthalic acid diester was liable to vaporize from the surface of the magnetic layer under the high temperature, the diester could not retain properly oleyl stearate in the magnetic layer and hence oleyl stearate easily deposited as white powder on the surface of the magnetic layer.

Sample Nos. 16 to 19 are the cases of using various kinds of fatty acid esters each having a solidification initiating temperature of at least 30° C. and a molecular weight of at least 450. Each sample showed good results with respect to the running durability and blooming.

Sample Nos. 23 to 26 are the cases of not using phthalic acid diester of the present invention. Each sample showed a considerably good running durability but in each sample, blooming occured and a white powder was observed on the whole surface of the magnetic layer.

EXAMPLE 3

This example shows the cases of using the benzenetricarboxylic acid triesters shown by formula (I).

The same procedure as in Example 1 was repeated except that the phthalic acid diester was changed to benzenetricarboxylic acid triestere as shown in Table 5 below, and Colonate L (trade name, made by Nippon Polyurethane K.K.) was used for the polyisocyanate was employed.

TABLE 5

| Sample No. | Benzenetricarboxylic Acid Triester | Amount (parts) |
|---|---|---|
| 1 | Triester No. 1 | 10 |
| 2 | Triester No. 3 | 10 |
| 3 | Triester No. 4 | 10 |
| 4 | Triester No. 5 | 10 |
| 5 | Triester No. 6 | 10 |
| 6 | Triester No. 7 | 10 |
| 7 | Triester No. 8 | 10 |
| 8 | Triester No. 11 | 10 |
| 9* | $C_{17}H_{35}COOC_4H_9$ | 10 |
| 10* | $C_{17}H_{35}COOC_{18}H_{37}$ | 10 |
| 11* | $C_{17}H_{35}COO(CH_2)_9C—(CH_3)_3$ | 10 |
| 12* | $C_{17}H_{35}COOC_{18}H_{35}$ | 10 |
| 13* | 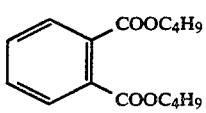 | 10 |

TABLE 5-continued

| Sample No. | Benzenetricarboxylic Acid Triester | Amount (parts) |
|---|---|---|
| 14* | 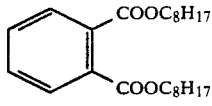 | 10 |
| 15* | Sorbitan Trioleate | 10 |

*Comparative sample

The running durability of each sample was evaluated by the measured value thereof in the case of running each sample under the condition of 25° C., 50% RH and the measured value thereof in the case of running each sample under the aforesaid thermocycle as in Example 1.

An initial start torque (also called as adsorption torque) was evaluated by measuring the torque at the initiation of rotation in the case of re-starting each sample after running the sample using a 3.5 inch floppy disk drive ("OA-D32W") at 300 r.p.m for 1 minute under the condition of 40° C., 80% RH and then resting the sample for 30 minutes at the state of head load.

The evaluation results obtained are shown in Table 6 below.

TABLE 6

| Sample No. | Running Durability | | Initial Start Torque (g · cm) |
|---|---|---|---|
| | 25° C., 50% RH | Thermocycle | |
| 1 | 22,500,000 paths | 21,000,000 paths | 60 |
| 2 | 26,000,000 paths | 26,500,000 paths | 68 |
| 3 | 23,000,000 paths | 23,000,000 paths | 59 |
| 4 | 20,500,000 paths | 19,000,000 paths | 74 |
| 5 | 23,500,000 paths | 22,200,000 paths | 70 |
| 6 | 25,000,000 paths | 24,300,000 paths | 72 |
| 7 | 26,000,000 paths | 23,800,000 paths | 55 |
| 8 | 24,000,000 paths | 21,600,000 paths | 62 |
| 9* | 6,000,000 paths | 1,000,000 paths | 63 |
| 10* | many drop out at 2,000,000 paths | many drop out at 2,000,000 paths | 55 |
| 11* | 20,000,000 paths | 11,500,000 paths | 180 |
| 12* | 22,000,000 paths | 20,000,000 paths | 210 |
| 13* | 15,000,000 paths | 5,000,000 paths | 65 |
| 14* | 18,000,000 paths | 3,000,000 paths | 75 |
| 15* | 15,000,000 paths | 14,000,000 paths | 155 |

*Comparative sample

Sample Nos. 1 to 8 containing the benzenetricarboxylic acid triesters of formula (II) described above in the magnetic layers showed good running durability and small initial start torque. On the other hand, Sample Nos. 9 to 15 using other ester compounds than the benzenetricarboxylic acid triesters showed insufficient running durability and large initial start torque.

In particular, in the case of using stearyl stearate (Sample No. 10), the occurence of drop out was remarkable at 2,000,000 paths.

Also, in Sample Nos. 13 and 14 using phthalic acid diesters corresponding to those of formula (I) but having the total carbon atoms of $R^1$ and $R^2$ of less than 22, the running durability after the thermocycle was reduced.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having formed thereon a magnetic layer mainly composed of a ferromagnetic powder and a binder resin, wherein a phthalic acid diester represented by formula (I) and a fatty acid ester having a solidification initiating temperature of at least 30° C. and a molecular weight of at least 450 are contained in the magnetic layer or coated on the magnetic layer:

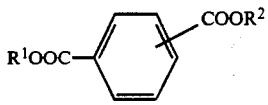

wherein $R^1$ and $R^2$, which may be the same or different, each represents a straight chain or branched alkyl or alkenyl group and the sum of the carbon atoms of $R^1$ and $R^2$ is at least 30,

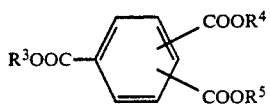

said phthalic acid diester represented by formula (I) being contained in the magnetic layer in an amount of from 1 to 25% by weight based on the amount of the ferromagnetic power in the magnetic layer or being coated on the magnetic layer in an amount of from 2 to 50 mg/m², said fatty acid ester being contained in the magnetic layer in an amount of from 1 to 25% by weight based on the amount of the ferromagnetic powder in the magnetic layer or being coated on the magnetic layer in an amount of from 2 to 80 mg/m².

2. The magnetic recording medium of claim 1, wherein the phthalic acid diester shown by formula (I) is a terephthalic acid diester.

3. The magnetic recording medium of claim 1, wherein at least one of $R^1$ and $R^2$ of the phthalic acid diester shown by formula (I) is a branched alkyl or alkenyl group.

4. The magnetic recording medium of claim 1, wherein the phthalic acid diester represented by formula (I) and the fatty acid ester are contained in the magnetic layer.

5. The magnetic recording medium of claim 1, wherein the phthalic acid diester represented by formula (I) and the fatty acid ester are coated as a top coat layer on the surface of the magnetic layer.

6. The magnetic recording medium of claim 1, wherein the fatty acid ester which is used together with the phthalic acid diester shown by formula (I) is oleyl palmitate, oleyl stearate, or oleyl behenate.

7. The magnetic recording medium of claim 1, wherein the fatty acid ester is oleyl stearate.

8. The magnetic recording medium of claim 1, wherein the amount of the phthalic acid diester is from 10 to 50% by weight of the total weight of the phthalic acid diester and the fatty acid ester.

9. The magnetic recording medium of claim 1, wherein the fatty acid ester is oleyl stearate, myristyl palmitate, stearyl palmitate, isosteryl stearate or stearyl stearate.

* * * * *